(12) United States Patent
Hämmerl

(10) Patent No.: US 11,760,614 B2
(45) Date of Patent: Sep. 19, 2023

(54) VEHICLE COMPRISING A SURROUNDINGS MONITORING DEVICE

(71) Applicant: Jungheinrich Aktiengesellschaft, Hamburg (DE)

(72) Inventor: Robert Hämmerl, Moosburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 221 days.

(21) Appl. No.: 17/018,546

(22) Filed: Sep. 11, 2020

(65) Prior Publication Data
US 2021/0078842 A1    Mar. 18, 2021

(30) Foreign Application Priority Data

Sep. 12, 2019   (DE) ..................... 10 2019 213 922.1

(51) Int. Cl.
| | |
|---|---|
| *B66F 9/06* | (2006.01) |
| *B66F 9/075* | (2006.01) |
| *G05D 1/02* | (2020.01) |

(52) U.S. Cl.
CPC ............ *B66F 9/063* (2013.01); *B66F 9/0755* (2013.01); *B66F 9/07586* (2013.01); *G05D 1/024* (2013.01); *G05D 2201/0216* (2013.01)

(58) Field of Classification Search
CPC .... B66F 9/063; B66F 9/0755; B66F 9/07586; B66F 17/003; G05D 1/024; G05D 2201/0216
See application file for complete search history.

(56) References Cited

U.S. PATENT DOCUMENTS

| | | | | |
|---|---|---|---|---|
| 4,162,869 A | * | 7/1979 | Hitomi ..................... | B62D 1/24 414/792.8 |
| 4,322,670 A | * | 3/1982 | Taylor .................. | G05D 1/0265 318/587 |

(Continued)

FOREIGN PATENT DOCUMENTS

| | | |
|---|---|---|
| DE | 102015010718 A1 | 2/2017 |
| DE | 102016120117 A1 | 4/2018 |
| JP | 2019008359 A | 1/2019 |

OTHER PUBLICATIONS

German Application No. DE10 2019 213 922.1, Search Report, dated Jan. 14, 2021, 4 pages.

*Primary Examiner* — Tyler J Lee
*Assistant Examiner* — Yufeng Zhang
(74) *Attorney, Agent, or Firm* — Kilpatrick Townsend & Stockton LLP

(57) ABSTRACT

The invention relates to a vehicle, comprising a vehicle floor, three vehicle wheels and a surroundings monitoring device comprising a plurality of surroundings sensor units, in particular laser scanners, each of which has a continuous monitoring angle range in a horizontal plane below the vehicle floor, wherein the surroundings monitoring device comprises two surroundings sensor units which are arranged under the vehicle floor, within the plan view contour of the vehicle, such that the monitoring angle ranges thereof overlap one another in part and define a common horizontal scanning region in which gaps or shadowing in the monitoring angle range of a particular surroundings sensor unit, within the plan view of the vehicle, are captured by the monitoring angle range of the other surroundings sensor unit, such that the surroundings monitoring device offers 360° all-around monitoring around the vehicle.

12 Claims, 1 Drawing Sheet

(56) References Cited

U.S. PATENT DOCUMENTS

| | | | |
|---|---|---|---|
| 4,802,096 A | 1/1989 | Hainsworth et al. | |
| 2007/0247327 A1* | 10/2007 | Hammerl | B66F 9/07563 |
| | | | 701/2 |
| 2015/0202770 A1* | 7/2015 | Patron | G06Q 30/0265 |
| | | | 901/50 |
| 2017/0122741 A1* | 5/2017 | Sakai | G01C 21/005 |
| 2018/0072212 A1* | 3/2018 | Alfaro | B60P 1/48 |
| 2018/0215539 A1* | 8/2018 | Kimura | G05D 1/0274 |
| 2020/0356094 A1* | 11/2020 | Gagne | G01S 17/89 |

* cited by examiner

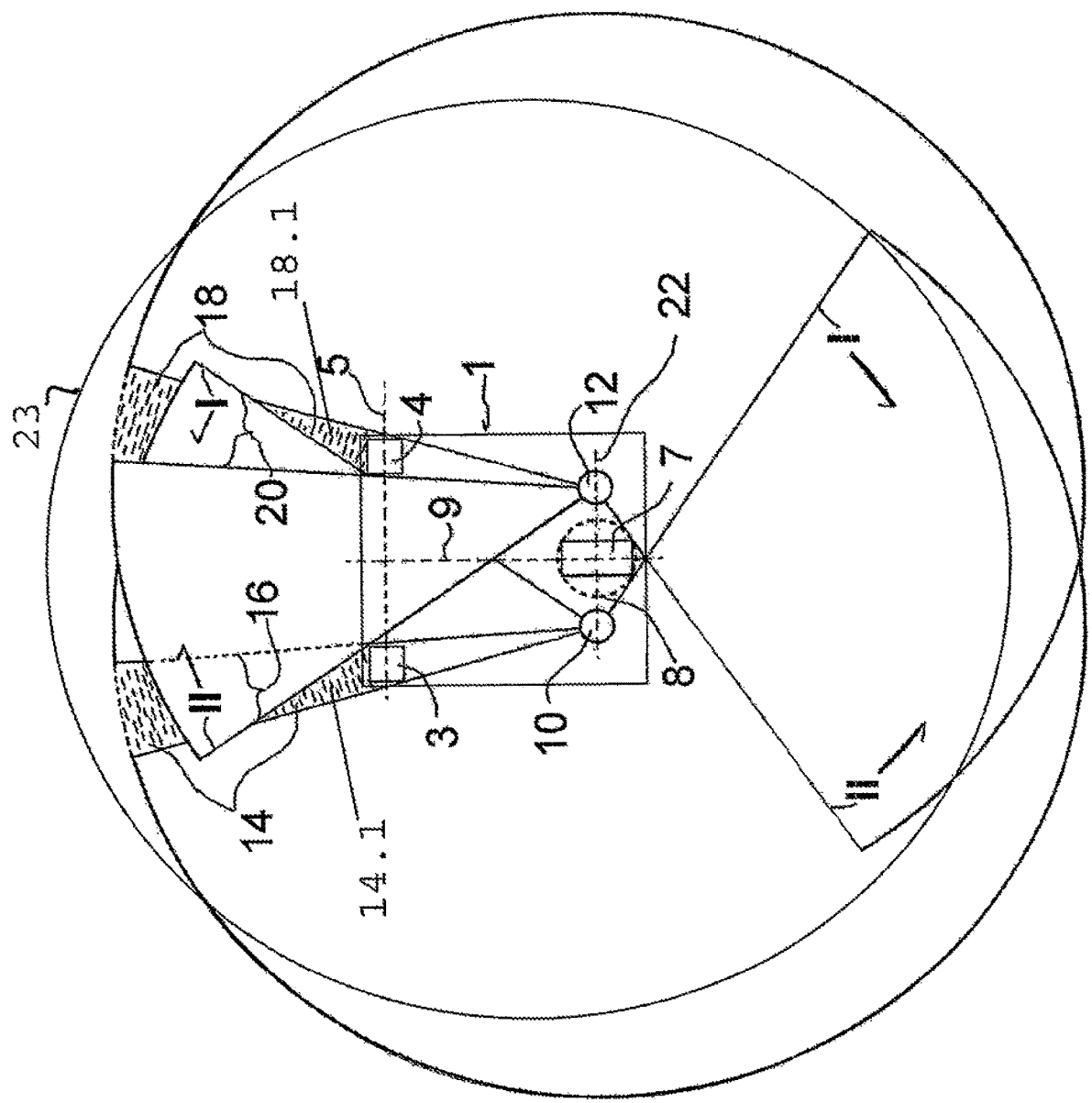

VEHICLE COMPRISING A SURROUNDINGS MONITORING DEVICE

CROSS REFERENCE TO RELATED APPLICATION

This application claims priority to German Patent Application No. 10 2019 213 922A, filed in Germany on Sep. 12, 2019, the entire contents of which are hereby incorporated herein by this reference.

The invention relates to a vehicle, in particular an industrial truck, comprising a vehicle floor, three vehicle wheels, and a surroundings monitoring device comprising a plurality of surroundings sensor units, in particular laser scanners, each of which has a continuous monitoring angle range in a horizontal plane.

Vehicles of this kind, comprising surroundings monitoring devices, are known e.g. as automated industrial trucks (automatic guided vehicles). The surroundings monitoring devices are safety measures for preventing the vehicle from colliding with objects within a radius of a few metres around the vehicle. The known industrial trucks comprise, as surroundings sensor units, laser scanners which are arranged so as to be diagonally offset, at side corners of the industrial truck, substantially outside of the plan view contour of the vehicle floor or vehicle frame, and allow, overall, for 360° all-around monitoring around the industrial truck. The surroundings sensors are attached to the industrial truck in a protruding manner, with the result that they increase the length and the width of the industrial truck in an unfavourable manner. As soon as the surroundings monitoring device detects an object close to the ground, in the all-around monitoring sphere, the vehicle stops and/or outputs a warning signal.

The problem addressed by the present invention is that of providing a vehicle of the type in question, which comprises a small number of surroundings sensor units for implementing 360° all-around monitoring around the vehicle, the surroundings sensor units being accommodated in a protected manner and not resulting in lengthening or widening of the vehicle, in the plan view contour thereof.

Proceeding from a vehicle having the features of the preamble of claim 1, in order to solve this problem it is proposed that the surroundings monitoring device should comprise two surroundings sensor units which are arranged below the vehicle floor, within the plan view contour of the vehicle floor, such that the monitoring angle ranges thereof overlap in part and define a common horizontal scanning region in which gaps or shadows in the monitoring angle range of a particular surroundings sensor unit within the plan view contour of the vehicle floor are captured by the monitoring angle range of the other surroundings sensor unit, such that the monitoring angle range offers 360° all-around monitoring around the vehicle.

The vehicle thus designed requires just two surroundings sensor units of the surroundings monitoring device, preferably in the form of laser scanners, in order to perform complete all-around monitoring of the vehicle, said surroundings sensor units being provided under the vehicle such that they do not require space outside of the plan view contour of the vehicle floor or vehicle frame.

The vehicle is preferably an automated industrial truck, i.e. a self-driving or driverless industrial truck, the movement options of which are also influenced by signals of the surroundings monitoring device. If the surroundings monitoring device identifies a person or an object, in particular in front of the vehicle in the direction of travel, it thus preferably triggers stoppage of the vehicle and optionally a warning signal of the vehicle.

According to a preferred embodiment of the invention, two of the wheels are arranged at a mutual spacing on a first common straight line, and the third wheel is arranged on a second straight line so as to be at a spacing from the first straight line, which second straight line extends perpendicularly to the first straight line and intersects therewith, in particular centrally between the two wheels arranged on the first straight line.

The two wheels that are arranged on a common straight line, so as to be mutually spaced, are preferably non-steered load support wheels, in particular front wheels, whereas the third wheel is a steerable drive wheel, in particular rear wheel.

According to a particularly preferred embodiment of the invention, the two surroundings sensor units together with the third wheel are arranged on a straight line, extending in parallel with the first straight line, so as to be at a small spacing from the third wheel, the third wheel being positioned between the surroundings sensor units. Such an arrangement of the surroundings sensor units in the direct vicinity of the third wheel provides good protection for the surroundings sensor units, also in the case of ramp transitions.

Preferably, each monitoring sensor unit has a continuous monitoring angle range of from 255° to 280°, and in particular of approximately 270°. Laser scanners of this kind having a monitoring angle range of approximately 270° are commercially available, as such, in specialised trade, and have been found to function well for the use described herein. Developments of the invention are furthermore specified in claims 9 and 10.

The monitoring angle ranges of the surroundings sensor units are preferably configured such that the third vehicle wheel is located between the start and end of the particular monitoring angle range, and thus in a blind angle range of the particular surroundings sensor unit.

An embodiment of the invention will be explained in greater detail in the following, with reference to FIG. 1. FIG. 1 schematically shows the mode of operation of an industrial truck comprising a surroundings monitoring device according to the invention. FIG. 1 is a simplified schematic view of the plan view contour.

In FIG. 1, in the example shown the reference sign 1 denotes the outline of an industrial truck (without a load carrying device), in plan view (plan view contour). In this case, 3 and 4 denote the position of two non-steered load support wheels (front wheels) which are arranged at the bottom of the industrial truck, so as to be mutually spaced, on a first common straight line 5 close to the front edge of the contour, shown, of the industrial truck. Said load support wheels are generally located in the region of the load part of the industrial truck, in particular in the front region of a load arm, in each case. A wheel 7 (rear wheel) that is driven by a motor and is steerable, is arranged on a second straight line 9 so as to be at a spacing from the first straight line 5, which second straight line extends perpendicularly to the first straight line 5 and intersects therewith, centrally between the two wheels 3, 4 arranged on the first straight line 5.

Said steered drive wheel is typically arranged in the region of the drive part of the industrial truck. The industrial truck is supported on the ground by means of the three wheels 3, 4 and 7 arranged at the bottom of said industrial truck. In FIG. 1, reference sign 8 denotes the rotation contour or steering contour of the drive wheel 7.

On both sides of the drive wheel 7, in the vicinity thereof, a respective laser scanner 10 or 12 is arranged as a surroundings sensor unit, under the floor of the industrial truck, within the plan view contour 1. Each of the laser scanners 10 and 12 has a horizontal monitoring angle range of approximately 270° under the industrial truck base. The laser scanners should be arranged as low as possible, in order to achieve a scanning plane that is continuous as far as possible, such that it is also possible to capture low objects, such as lowered conveyed goods carrier fork prongs of other industrial trucks, in the monitoring angle ranges I-I and II-II.

The angle edges of the monitoring angle range of the laser scanner 10 are denoted by I in FIG. 1, while the angle edges of the monitoring angle range of the laser scanner 12 are denoted by II in FIG. 1.

It is clearly visible, in FIG. 1, that the monitoring angle ranges I-I and II-II overlap one another in some regions of the surroundings of the industrial truck, in order to thereby also capture the shadowing, caused by the wheels 3, 4, 7, of the monitoring angle range of one of the laser scanners 10 and 12, using the monitoring angle range of the other laser scanner 12 or 10, respectively, and to thereby allow for 360° all-around monitoring of the surroundings of the industrial truck.

Thus, e.g. a region of the shadowing of the monitoring angle range I, I of the laser scanner 10 by the front wheel 3 is denoted by 14 in FIG. 1, the monitoring angle range II, II of the laser scanner 12 being superimposed on said shadowing region 14 at 16. In a corresponding manner, the monitoring angle range I-I is superimposed on the shadowing region 18 of the laser scanner 12 by the front wheel 4, at 20, such that the surroundings of the industrial truck are monitored by the surroundings monitoring device, also in the two shadowing regions 14, 18. Owing to the shadow-casting of the wheels, monitoring is not possible in the region 14.1 and 18.1 of the front wheels 3 and 4. It is provided, however, for the vehicle to be stopped before an object enters into the shadow region 14.1 and 18.1 that is not monitored. For this purpose, a protective field 23 is provided, the protective field extending outwards, over the shadow regions 14.1 and 18.1. The monitoring range of each laser scanner 10 and 12 is e.g. 5 m.

Seen in plan view, the two laser scanners 10 and 12 are arranged on a common line 22, having the driven rear wheel 7 in the vicinity thereof. The line 22 may be a common straight line. Owing to such an arrangement of the laser scanners 10 and 12 in the vicinity of the drive wheel 7, although they are lowered significantly the laser scanners are well protected, for example also in the case of the industrial truck travelling over ramp transitions.

The particular 90° blind angle range of the laser scanners 10 or 12 is arranged such that the driven rear wheel 7 is located therein, the blind angle range of the laser scanner 10 being covered by the monitoring angle range II-II of the laser scanner 12, and the blind angle range of the laser scanner 12 being covered by the monitoring angle range I-I of the laser scanner 10.

The invention claimed is:

1. A vehicle comprising:
   a vehicle floor,
   multiple vehicle wheels, wherein two wheels of the multiple vehicle wheels are arranged on a first straight line and a third wheel of the multiple vehicle wheels is arranged having a spacing from the first straight line, and
   a surroundings monitoring device comprising a plurality of surroundings sensor units that comprise laser scanners, each of the surroundings sensor units having a continuous monitoring angle range in a respective horizontal plane that is below the vehicle floor,
   wherein the surroundings monitoring device further comprises two surroundings sensor units which are arranged under the vehicle floor such that the third wheel is positioned between the two surroundings sensor units such that the continuous monitoring angle ranges of the two surroundings sensor units overlap one another in part and define a common horizontal scanning region wherein a portion of the common horizontal scanning region (i) is below the vehicle floor within a plan view contour of the vehicle and (ii) is between the two wheels arranged on the first straight line and the third wheel,
   wherein, in the common horizontal scanning region, gaps or shadowing in a particular monitoring angle range of a particular surroundings sensor unit are captured by an additional monitoring angle range of the other surroundings sensor unit, such that the surroundings monitoring device offers 360° all-around monitoring around the vehicle.

2. The vehicle according to claim 1, wherein the vehicle is an automated industrial truck.

3. The vehicle according to claim 1, wherein the two wheels of the multiple vehicle wheels are arranged at a mutual spacing on the first straight line, and the third wheel of the multiple vehicle wheels is arranged on a second straight line so as to be at the spacing from the first straight line,
   the second straight line extending perpendicularly to the first straight line, and
   the second straight line intersecting with the first straight line centrally between the two wheels arranged on the first straight line.

4. The vehicle according to claim 3, wherein the two wheels that are arranged on the first straight line, so as to be mutually spaced, are non-steered load support wheels, and the third wheel is a steerable drive wheel.

5. The vehicle according to claim 3, wherein, in the plan view contour, the two surroundings sensor units together with the third wheel are arranged on an additional straight line that extends in parallel with the first straight line.

6. The vehicle according to claim 3, wherein the continuous monitoring angle ranges of the two surroundings sensor units are configured such that the third wheel is located between a start and an end of the particular monitoring angle range, and in a blind angle range of the particular surroundings sensor unit.

7. The vehicle according to claim 1, wherein each of the two surroundings sensor units has a respective continuous monitoring angle range in an angle range of from 255° to 280°.

8. The vehicle according to claim 7, wherein the respective continuous monitoring angle range of each of the two surroundings sensor units is approximately 270°.

9. The vehicle according to claim 1, wherein each of the two surroundings sensor units have a monitoring range of at least 3 m.

10. The vehicle according to claim 9, wherein the monitoring range of each of the two surroundings sensor units is approximately 5 m.

11. The vehicle according to claim 1, wherein the vehicle comprises load receiving means, which can be raised and lowered,
    wherein, when the load receiving means are raised, shadowing is brought about, within the continuous monitoring angle ranges of the two surroundings sensor units, by the vehicle wheels.

12. The vehicle according to claim 1, wherein a protective field is defined in the surroundings monitoring device such that the vehicle is stopped in an event of an object entering the protective field, and in that the protective field extends outwards, away from the vehicle, beyond a shadow region.

\* \* \* \* \*